(12) United States Patent
Glynn et al.

(10) Patent No.: US 8,371,105 B2
(45) Date of Patent: *Feb. 12, 2013

(54) HYDRAULIC SYSTEM FOR FAN PITCH CHANGE ACTUATION OF COUNTER-ROTATING PROPELLERS

(75) Inventors: Christopher Charles Glynn, Lawrenceburg, IN (US); Darek Tomasz Zatorski, Ft. Wright, KY (US); Donald Scott Yeager, Hamilton, OH (US); Nicholas Rowe Dinsmore, Cincinnati, OH (US); Jeffrey Raymond Menard, Reading, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/894,578

(22) Filed: Sep. 30, 2010

(65) Prior Publication Data

US 2012/0079808 A1    Apr. 5, 2012

(51) Int. Cl.
*F02K 3/00* (2006.01)

(52) U.S. Cl. .......................................... 60/268; 416/156

(58) Field of Classification Search ............... 60/39.162, 60/226.1, 268; 415/130, 129, 55; 416/130, 416/155–156, 157 B, 157 R See application file for complete search history.

(56) References Cited

U.S. PATENT DOCUMENTS

| | | | |
|---|---|---|---|
| 3,363,419 A | 1/1968 | Wilde | |
| 4,621,978 A | 11/1986 | Stuart | |
| 4,657,484 A | 4/1987 | Wakeman et al. | |
| 4,738,590 A | 4/1988 | Butler | |
| 4,738,591 A | 4/1988 | Butler | |
| 4,772,181 A * | 9/1988 | Poucher | 416/33 |
| 4,863,352 A | 9/1989 | Hauser et al. | |
| 4,913,623 A | 4/1990 | Schilling et al. | |
| 4,927,329 A | 5/1990 | Kliman et al. | |

(Continued)

FOREIGN PATENT DOCUMENTS

DE    896597    12/1953

(Continued)

OTHER PUBLICATIONS

PCT International Search Report, International Application No. PCT/US2011/045889, Nov. 11, 2011.

*Primary Examiner* — Phutthiwat Wongwian
(74) *Attorney, Agent, or Firm* — General Electric Company; William Scott Andes; Steven J. Rosen

(57) ABSTRACT

Spaced apart counter-rotatable forward and aft rows of forward and aft propellers are mounted on forward and aft rotatable frames. Hydraulic rotary forward and aft pitch change actuators on the frames are operable for controlling pitch of the propellers. A hydraulic fluid supply outboard of the frames is connected to forward and aft rotary unions which are operable for transferring hydraulic fluid between forward and aft union stators to forward and aft union rotors mounted within the forward and aft rotary unions. The forward union rotor is operable to transfer the hydraulic fluid from the forward rotary union to the aft pitch change actuators and the aft union rotor is operable to transfer the hydraulic fluid from the aft rotary unions to the forward pitch change actuators. The forward and aft rotatable frames counter-rotatably mounted on a structural frame located forward or aft of the propellers.

24 Claims, 14 Drawing Sheets

U.S. PATENT DOCUMENTS

| | | | |
|---|---|---|---|
| 4,936,746 A * | 6/1990 | Mayo et al. | 416/46 |
| 5,154,580 A * | 10/1992 | Hora | 416/129 |
| 5,242,265 A | 9/1993 | Hora et al. | |
| 5,443,229 A | 8/1995 | O'Brien et al. | |
| 6,322,341 B1 | 11/2001 | Haas | |
| 2008/0253881 A1 | 10/2008 | Richards | |
| 2010/0014976 A1 | 1/2010 | Arel et al. | |
| 2010/0047068 A1 | 2/2010 | Parry et al. | |

FOREIGN PATENT DOCUMENTS

| | | |
|---|---|---|
| EP | 0 580 319 A1 | 1/1994 |
| GB | 534528 | 3/1941 |
| GB | 559165 | 2/1944 |
| GB | 2209371 A | 5/1989 |
| WO | WO 2009/109355 A1 | 9/2009 |

* cited by examiner

HYDRAULIC SYSTEM FOR FAN PITCH CHANGE ACTUATION OF COUNTER-ROTATING PROPELLERS

BACKGROUND OF THE INVENTION

1. Field of the Invention

The invention relates to pitch change systems for aircraft gas turbine engine counter-rotatable propellers and, more particularly, to hydraulic systems for pitch change actuation of counter-rotatable propellers.

2. Description of Related Art

One type of aircraft gas turbine engine includes a power turbine driving counter-rotatable propeller rotors and the power turbine is powered by a gas generator. A pitch change actuation system including a hydraulic fluid delivery system is used for pitch change actuation of counter-rotatable propellers mounted on the counter-rotatable propeller rotors. The pitch change system includes pitch change actuators mounted in counter-rotatable frames which also support the counter-rotatable propellers and blades.

U.S. Pat. No. 4,621,978 by Alan R. Stuart, which issued Nov. 11, 1986, is entitled "Counterrotating Power Turbine", and is assigned to the General Electric Company, the same assignee as the present patent application, discloses using slip rings to transmit the hydraulic fluid between a static (non-rotatable) engine support structure and the counter-rotatable propeller rotors. Slip rings are also devices used to transfer hydraulic or other fluids or hydraulic pressure from a non-rotating or stationary element to a rotating element in a radial direction. The small area provided by the slip rings to transfer a required volume of hydraulic fluid or oil to both rotating frames may be insufficient at a certain pressure.

Thus, it is highly desirable to provide a hydraulic fluid transfer that has greater and better hydraulic transferring capability between static (non-rotatable) engine support structure and counter-rotatable propeller rotors than that of slip rings.

SUMMARY OF THE INVENTION

A propulsion apparatus includes axially spaced apart counter-rotatable forward and aft rows of forward and aft propellers mounted on forward and aft rotatable frames respectively and rotatable about a centerline axis. A pitch change system includes hydraulic forward and aft pitch change actuators mounted on the forward and aft rotatable frames and connected to and operable for controlling and setting pitch of the forward and aft propellers respectively. A hydraulic fluid supply mounted outboard of the forward and aft rotatable frames is hydraulically connected to forward and aft rotary unions including forward and aft union rotors mounted within forward and aft union stators respectively. The forward and aft rotary unions are operable for transferring hydraulic fluid between the forward and aft union stators and the forward and aft union rotors respectively, the forward union rotor is hydraulically connected to the aft pitch change actuators for transferring the hydraulic fluid from the forward rotary union to the aft pitch change actuators, and the aft union rotor is hydraulically connected to the forward pitch change actuators for transferring the hydraulic fluid from the aft rotary union to the forward pitch change actuators.

The forward and aft rotary unions may be axially spaced apart and operable for transferring the hydraulic fluid radially inwardly and outwardly between the forward and aft union stators and the forward and aft union rotors respectively. Forward and aft drive shafts may be drivingly connected to the forward and aft rotatable frames respectively and the aft union rotor may include an annular rotor body integral with the forward drive shaft.

Forward and aft rotatable struts of the forward and aft rotatable frames respectively may extend radially across a flowpath which passes through the forward and aft rotatable frames and the forward and aft pitch change actuators may be hydraulic rotary actuators mounted radially inwardly of the flowpath in a one to one ratio with the forward and aft rotatable struts of the forward and aft rotatable frames respectively. Forward and aft rotatable shafts extend through the forward and aft rotatable struts connecting the forward and aft pitch change actuators to the forward and aft propellers respectively in a one to one ratio.

Forward and aft drive shafts may be drivingly connected to the forward and aft rotatable frames respectively and the aft union rotor may include an annular rotor body integral with the forward drive shaft. The forward union rotor may extend aftwardly through the aft union rotor, the aft union rotor may include an annular rotor body integral with the forward drive shaft, and the forward and aft union rotors respectively may carry at least in part fluid passageways. The fluid passageways carried by the forward union rotor are in fluid communication with the hydraulic fluid forward supply and return lines and the aft supply and return rotatable lines respectively and the fluid passageways carried by the annular rotor body within the aft union rotor are in fluid communication with the hydraulic fluid aft supply and return lines and the forward supply and return rotatable lines respectively. Each of the forward and aft union stators may include at least first and second fluid chambers having at least first and second stator channels respectively extending radially outwardly from and open through an annular radially inner stator surface of the forward and aft union stators. Each of the fluid chambers have at least one inlet port connected to the hydraulic fluid supply and the fluid passageways are in fluid communication with the fluid chambers.

The aft union rotor may include an annular rotor stator race mounted on the annular rotor body, a radially outer rotor surface of the annular rotor stator race in slidably sealing engagement with the inner stator surface, transfer holes in fluid communication with the fluid chambers and radially extending entirely through the annular rotor stator race and the annular rotor body to an annular rotary manifold mounted to the annular rotor body. The transfer holes are in fluid communication with the fluid passageways extending axially aftwardly through the rotary manifold and the fluid passageways include intermediate tubes in part connecting portions of the fluid passageways in the rotary manifold to radial sections of the fluid passageways.

The forward and aft rotary unions may be integrated in a single nested rotary union in which the forward and aft union stators are integrated in a common single stator and the nested rotary union is operable for transferring hydraulic fluid radially inwardly and outwardly between the common single stator and the forward and aft union rotors.

An aircraft gas turbine engine includes a gas generator upstream and operable to power a power turbine, a nacelle surrounding at least the gas generator, axially spaced apart counter-rotatable forward and aft rows of forward and aft propellers mounted on forward and aft rotatable frames respectively and rotatable about a centerline axis, the power turbine drivingly connected to the forward and aft rotatable frames, a pitch change system including hydraulic forward and aft pitch change actuators mounted on the forward and aft rotatable frames and connected to the forward and aft propellers and operable for controlling and setting pitch of the forward and aft propellers respectively, a hydraulic fluid supply mounted outboard of the forward and aft rotatable frames and connected to forward and aft rotary unions, the forward and aft rotary unions including forward and aft union rotors mounted within forward and aft union stators and operable for transferring hydraulic fluid between the forward and aft union stators and the forward and aft rotary union rotors respectively, the forward union rotor hydraulically connected and operable to transfer the hydraulic fluid to the aft pitch change actuator, and the aft union rotor hydraulically connected and operable to transfer the hydraulic fluid to the forward pitch change actuator.

The forward and aft drive shafts may be counter-rotatably connected to the power turbine and drivingly connected to the forward and aft rotatable frames respectively and the aft union rotor may include an annular rotor body integral with integral with the forward drive shaft. A power turbine rotor of the power turbine may be rotatably mounted on and between axially spaced apart forward and aft structural turbine frames of the engine, the power turbine rotor drivingly connected to an epicyclic gearbox, and the epicyclic gearbox drivingly connected by forward and aft drive shafts to the forward and aft rotatable frames for counter-rotatably driving the forward and aft rotatable frames and the forward and aft propellers mounted thereon.

The forward union stator may be mounted on the forward structural turbine frame and the forward union stator connected to the hydraulic fluid supply by hydraulic fluid forward supply and return lines and the aft union stator may be mounted on the aft structural turbine frame and the aft union stator connected to the hydraulic fluid supply by hydraulic fluid aft supply and return lines. The forward hydraulic rotary union is operable for transferring pressurized hydraulic fluid between the hydraulic fluid forward supply and return lines and aft supply and return rotatable lines respectively and the aft hydraulic rotary union is operable for transferring the pressurized hydraulic fluid between the hydraulic fluid aft supply and return lines and forward supply and return rotatable lines respectively. The forward union rotor is connected to the aft supply and return rotatable lines mounted in the aft rotatable frame and connected to the aft pitch change actuators and the aft union rotor is connected to the forward supply and return rotatable lines mounted in the forward rotatable frame and connected to the forward pitch change actuators.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
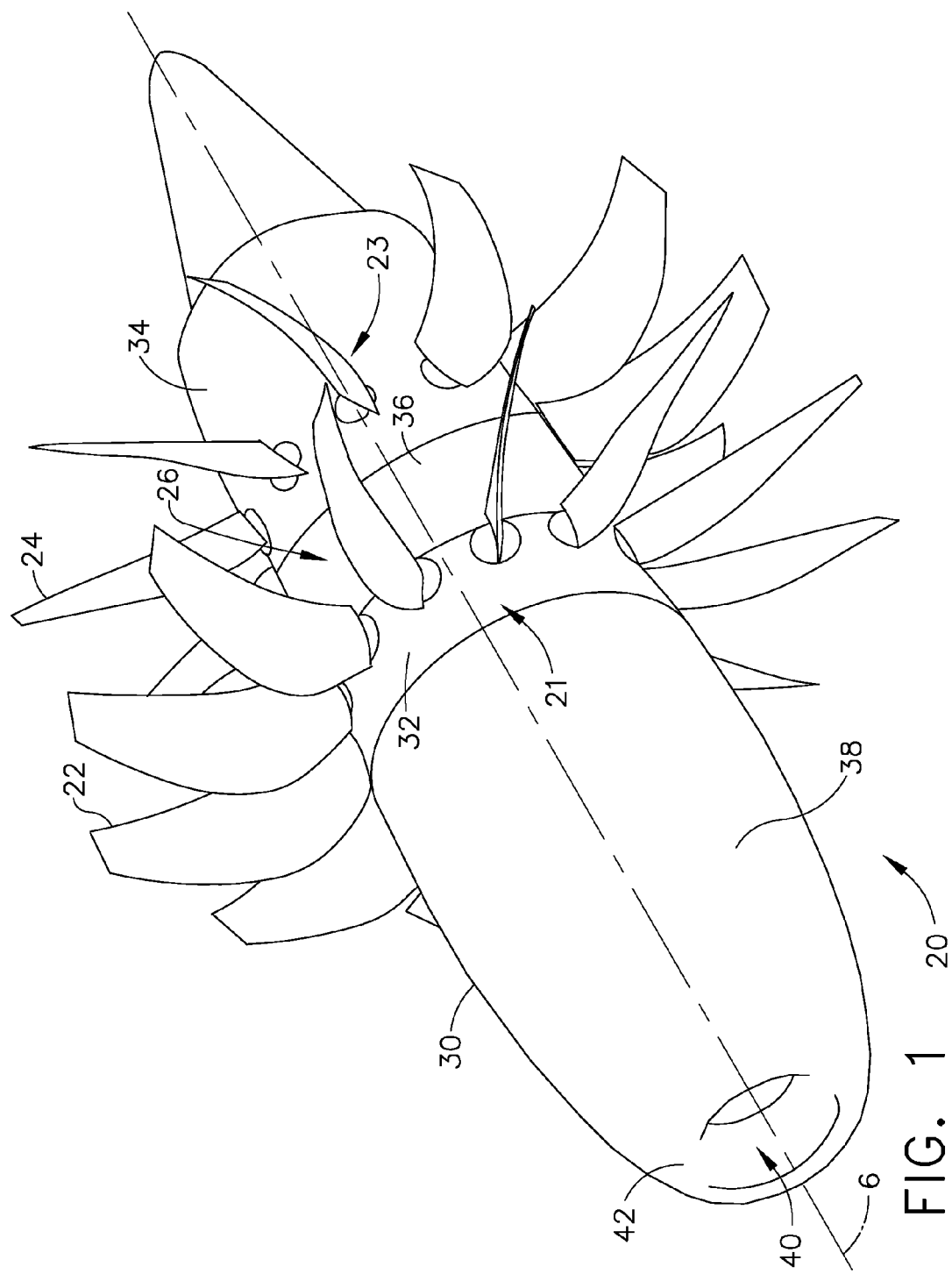
FIG. 1 is a prospective illustration of an exemplary embodiment of an aircraft gas turbine engine with counter-rotatable propellers.

FIG. 1 illustrates an unducted fan (UDF) or open rotor aircraft gas turbine engine 20 having a centerline axis 6 and axially spaced apart counter-rotatable forward and aft annular rows 21, 23 of forward and aft propellers 22, 24 respectively that are disposed radially outwardly of an outer shroud or nacelle 30. The forward and aft annular rows 21, 23 are illustrated herein as having 12 forward propellers 22 and 10 aft propellers 24 but other numbers of propellers may be used. The nacelle 30 includes a forward fairing 32 which is coupled to and rotatable with the forward propellers 22 and an aft fairing 34 coupled to and rotatable with the aft propeller 24.

Figure 2:
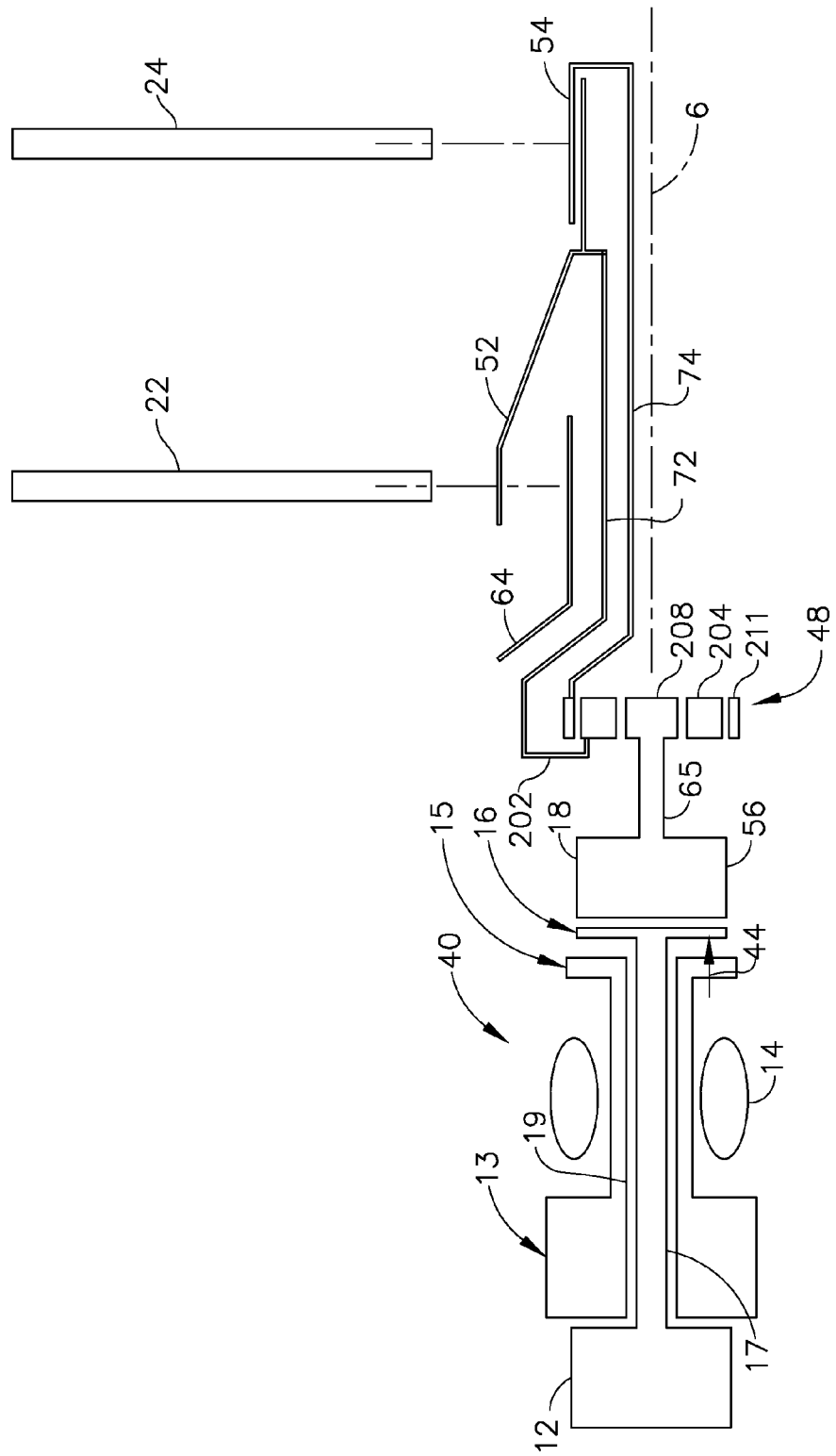
FIG. 2 is a diagrammatical illustration of an exemplary embodiment of an aircraft gas turbine engine with counter-rotatable propellers driven through a gearbox by a power turbine.

The nacelle 30 further includes a spacer fairing 36 disposed between the forward and aft fairings 32, 34 and a forward nacelle 38 disposed radially outwardly of and surrounding a gas generator 40 illustrated in FIG. 2. The forward nacelle 38 includes an inlet 42 that directs ambient air to the gas generator 40. The nacelle 30 provides the proper air flow characteristics to optimize the performance of the propellers 22, 24.

Figure 3:
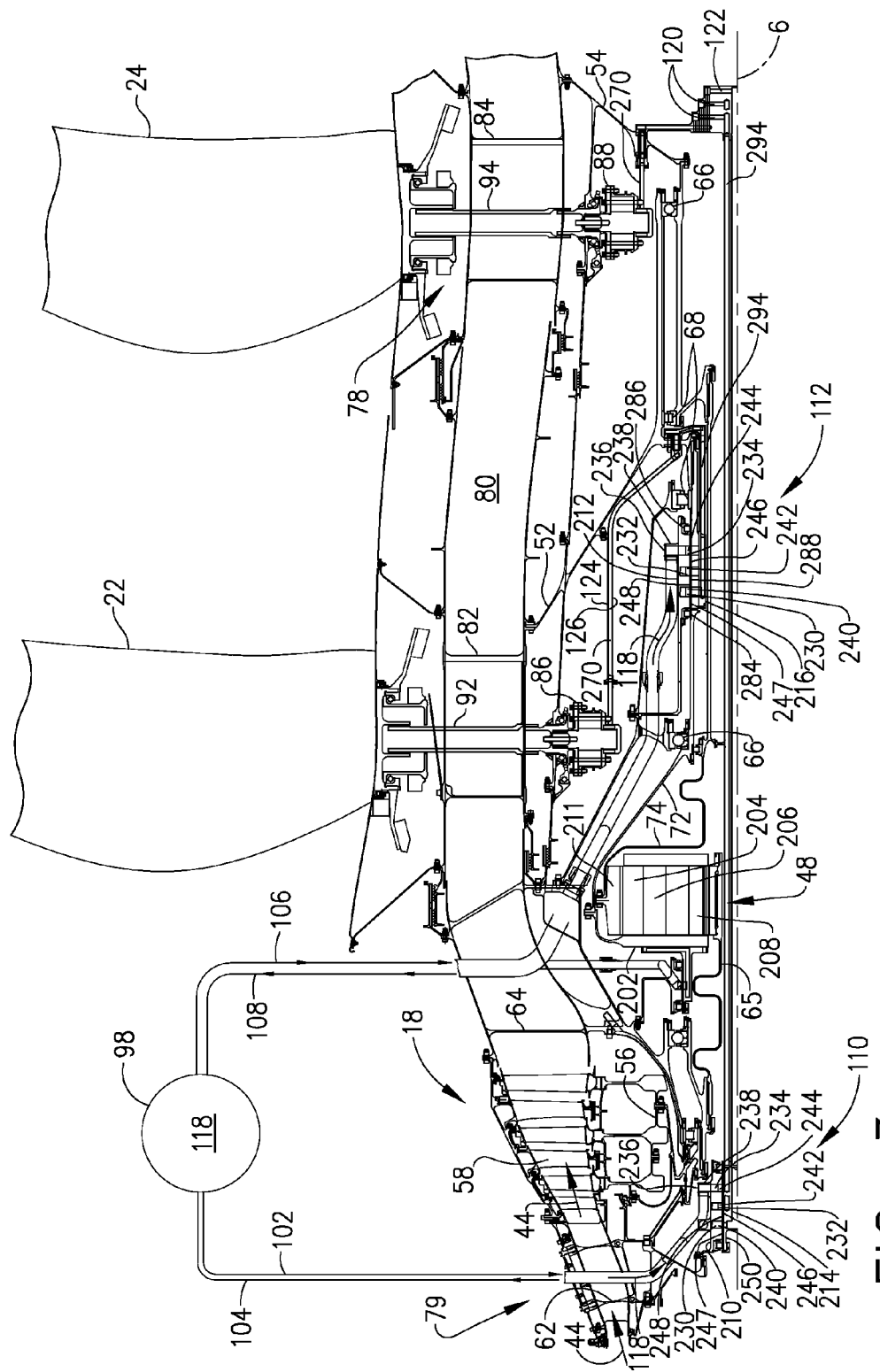
FIG. 3 is a longitudinal sectional view illustration of a portion of the engine illustrated in FIG. 1 including an exemplary embodiment of dual hydraulic fluid circuits for pitch change actuators for the counter-rotatable propellers illustrated in FIG. 1.

The open rotor aircraft gas turbine engine 20 illustrated in FIGS. 1-3 is a pusher type engine having the spaced apart counter-rotatable forward and aft annular rows 21, 23 of forward and aft propellers 22, 24 located generally at an aft end 26 of the engine and aft of the gas generator 40 and the forward nacelle 38 surrounding the gas generator 40. The forward and aft annular rows 21, 23 of the forward and aft propellers 22, 24 pusher type open rotor aircraft gas turbine engine 20 are aft of an aft structural turbine frame 64. The aft structural turbine frame 64 is used to transfer thrust forces produced by the forward and aft propellers 22, 24 to an aircraft (not shown) and hence the designation pusher.

Referring to FIG. 2, the gas generator 40 is a gas turbine engine with low and high pressure compressor sections 12, 13, a combustor section 14, and high and low pressure turbine sections 15, 16 in a downstream axial flow relationship. The low and high pressure turbine section 16, 15 drives the low and high pressure compressor sections 12, 13 through low and high pressure shafts 17, 19 respectively.

Located aft and downstream of the low pressure turbine section 16 is a power turbine 18 which drives the forward and aft annular rows 21, 23 of forward and aft propellers 22, 24. Air passing through the gas generator 40 is compressed and heated to form a high energy (high pressure/high temperature) gas stream 44 which then flows through the power turbine 18.

In the particular engine configuration illustrated in FIGS. 1-3, the power turbine 18 drives the forward and aft annular rows 21, 23 of forward and aft propellers 22, 24 through an epicyclic gearbox 48 which counter-rotates the forward and aft annular rows 21, 23 of forward and aft propellers 22, 24. The forward and aft propellers 22, 24 are mounted on forward and aft rotatable frames 52, 54 respectively. The power turbine 18 includes a power turbine rotor 56 including turbine blades 58. The power turbine rotor 56 is rotatably mounted on and between axially spaced apart forward and aft structural turbine frames 62, 64 and is drivingly connected to the gearbox 48 by a gearbox input shaft assembly 65. Forward and aft drive shafts 72, 74 are counter-rotatably connected to the gearbox 48 for driving the forward and aft rotatable frames 52, 54 respectively. The aft structural turbine frame 64 is used to transfer thrust forces produced by the forward and aft propellers 22, 24 to an aircraft (not shown).

The gearbox 48 includes a rotatable annular carrier 202 having planetary gears 204 rotatably mounted on pins 206 cantilevered off the annular carrier 202. A sun gear 208 is meshed with and rotatably mounted radially inwardly of the planetary gears 204 and a ring gear 211 is meshed with and rotatably mounted radially outwardly of the planetary gears 204. The sun gear 208 is drivenly connected to the power turbine 18 by the gearbox input shaft assembly 65. The sun gear 208 is operable to drive the planetary gears 204 which, in turn, are operable to drive the ring gear 211 counter-rotatably with respect to carrier 202. The carrier 202 is connected to the forward drive shaft 72 which in turn is connected to the forward rotatable frame 52 for driving the forward propeller 22 in a first circular direction (clockwise or counterclockwise). The ring gear 211 is connected to the aft drive shaft 74, which in turn, is connected to the aft rotatable frame 54 for driving the aft propeller 24 in a second circular direction opposite that of or counter to the first circular direction.

Figure 8:
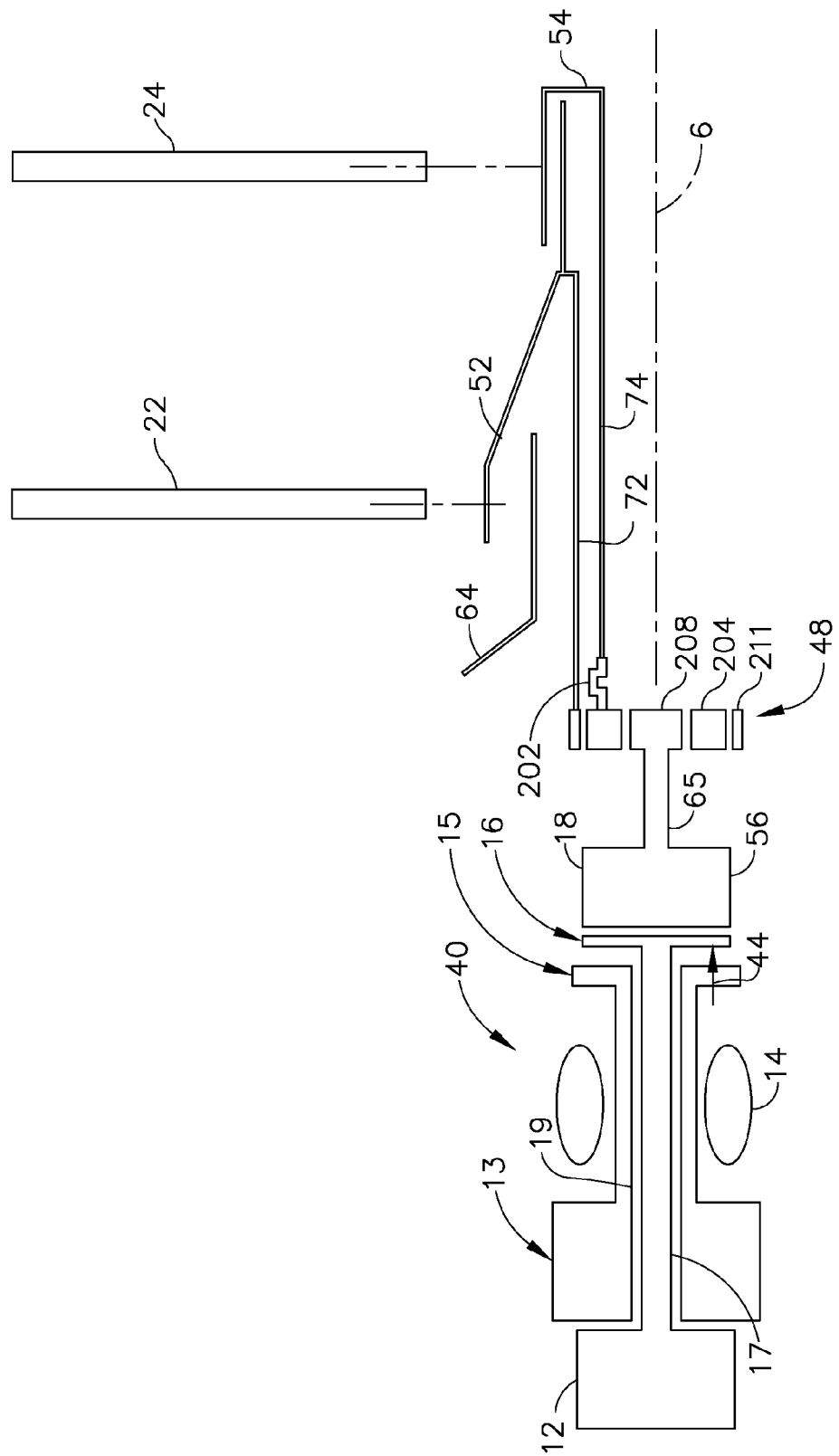
FIG. 8 is a diagrammatical illustration of an exemplary embodiment of an aircraft gas turbine engine with front propellers driven through a gearbox by a power turbine and with a ring gear driving forward propellers and a planet carrier driving aft propellers.

In an alternative arrangement for the gearbox 48, illustrated in FIG. 8, the carrier 202 is connected to the aft drive shaft 74, which in turn, is connected to the aft rotatable frame 54 for driving the aft propeller 24. The ring gear 211 is connected to the forward drive shaft 72 which in turn is connected to the forward rotatable frame 52 for driving the forward propeller 22.

Referring to FIG. 3, the forward and aft rotatable frames 52, 54 are counter-rotatably mounted on the aft structural turbine frame 64. The forward rotatable frame 52 is rotatably mounted on the aft structural turbine frame 64 by thrust and roller bearings 66, 68. The aft rotatable frame 54 is differentially and rotatably mounted on the forward rotatable frame 52 by thrust and roller bearings 66, 68. The gas stream 44 which flows through the power turbine 18 is then exhausted through an exhaust flowpath 80 which passes through the forward and aft rotatable frames 52, 54.

Forward and aft rotatable struts 82, 84 of the forward and aft rotatable frames 52, 54 respectively extend radially across the exhaust flowpath 80.

Independently controlled forward and aft pitch change systems 78, 79 control and set the pitch of the forward and aft propellers 22, 24. The forward and aft pitch change systems 78, 79 include hydraulic forward and aft pitch change actuators 86, 88 mounted on the forward and aft rotatable frames 52, 54 in a one to one ratio with the forward and aft rotatable struts 82, 84 respectively. The hydraulic forward and aft pitch change actuators 86, 88 are mounted radially inwardly of the exhaust flowpath 80. The forward and aft pitch change systems 78, 79 are illustrated herein as being three channel systems with three hydraulic channels for course and fine adjustment of each of the forward and aft pitch change actuators 86, 88 and one hydraulic channel for return from each of the pitch change actuators.

Forward and aft rotatable shafts 92, 94 extend and pass through the forward and aft rotatable struts 82, 84 and connect the forward and aft pitch change actuators 86, 88 to the forward and aft propellers 22, 24 respectively in a one to one ratio.

The hydraulic forward and aft pitch change actuators 86, 88 are illustrated herein as hydraulic rotary actuators which are devices which transform hydraulic power (pressure and flow) into rotational mechanical power (torque and speed). Rotary actuators convert fluid pressure into rotary power and develop instant torque in either direction.

Basic construction includes an enclosed cylindrical chamber containing a stationary barrier and a central shaft with vane(s) affixed thereto. Fluid pressure applied to either side of the vane will cause the shaft to rotate. Output torque developed is determined by the area of the vane, the number of vanes, and the fluid pressure applied. Speed of rotation is dependent on the flow and pressure capacities of the hydraulic system.

A controlled pressurized hydraulic fluid supply 98 statically mounted and located outboard of the forward and aft rotatable frames 52, 54 is hydraulically connected to forward and aft hydraulic rotary unions 110, 112 by hydraulic fluid forward supply and return lines 102, 104 and aft supply and return lines 106, 108 respectively. The hydraulic fluid supply 98 is operable to independently control and power the forward and aft pitch change actuators 86, 88 in order to change and control pitch of the forward and aft propellers 22, 24 respectively. The hydraulic fluid supply 98 provides hydraulic pressure or power for the independently controlled forward and aft pitch change systems 78, 79.

Rotary unions are rotary devices or rotary means for transferring hydraulic or other fluids or hydraulic pressure between a non-rotating or stationary element and a rotating element in a radial direction with respect to a centerline axis 6 about which rotors rotate within stators or about which rotors rotate concentrically outside of stators of the rotary means or rotary unions.

The embodiments of rotary unions illustrated herein are operable for transferring hydraulic or other fluids or hydraulic pressure between a non-rotating or stationary element and a rotating element in radially inwardly and outwardly directions with respect to a centerline axis 6. The forward hydraulic rotary union 110 is used to transfer pressurized hydraulic fluid 118 between the hydraulic fluid supply 98 and the aft pitch change actuator 88. The aft hydraulic rotary union 112 is used to transfer pressurized hydraulic fluid 118 between the hydraulic fluid supply 98 and the forward pitch change actuator 86.

The forward hydraulic rotary union 110 transfers the pressurized hydraulic fluid 118 between the hydraulic fluid forward supply and return lines 102, 104 to aft supply and return rotatable lines 120, 122 respectively. Two aft supply rotatable lines 120 are illustrated herein and one is for course adjustment and the other is for fine adjustment of each of the aft pitch change actuators 88.

The aft hydraulic rotary union 112 transfers the pressurized hydraulic fluid 118 between the hydraulic fluid aft supply and return lines 106, 108 and forward supply and return rotatable lines 124, 126 respectively. Two forward supply rotatable lines 124 are illustrated herein. One is for course adjustment and the other is for fine adjustment of each of the forward pitch change actuators 86. This is further illustrated in more detail in FIG. 5.

Referring to FIG. 3, the hydraulic fluid forward supply and return lines 102, 104 and hydraulic fluid aft supply and return lines 106, 108 are mounted at least in part in the axially spaced apart forward and aft structural turbine frames 62, 64 respectively. The aft supply and return rotatable lines 120, 122 mounted in the aft rotatable frame 54 are connected to the aft pitch change actuators 88.

The forward supply and return rotatable lines 124, 126 mounted in the forward rotatable frame 52 are connected to the forward pitch change actuators 86.

The aft hydraulic rotary union 112 illustrated in FIGS. 3-6 will be described in further detail and is substantially representative of both the forward and aft hydraulic rotary unions 110, 112 which include non-rotating or stationary annular forward and aft union stators 210, 212 and rotatable annular forward and aft union rotors 214, 216 which are rotatably mounted within the forward and aft union stators 210, 212 and rotatable about the axis 6 which is an axis of rotation for the forward and aft union rotors 214, 216. The forward union rotor 214 extends aftwardly through the aft union rotor 216. The forward and aft union stators 210, 212 are non-rotatably or fixably mounted on the forward and aft structural turbine frames 62, 64 respectively.

Each of the hydraulic rotary unions 110, 112 as illustrated herein has first, second, and third fluid chambers 230, 232, 234 formed by first, second, and third stator channels 240, 242, 244 extending radially outwardly from and open through an annular radially inner stator surface 246 of the forward and aft union stators 210, 212. The first, second, and third stator channels 240, 242, 244 are bounded by an annular rotor body 250 of the forward and aft union rotors 214, 216 thus form the radially inner first, second, and third fluid chambers 230, 232, 234. An annular rotor stator race 247 mounted on an annular rotor body 250 of the forward and aft union rotors 214, 216 includes a radially outer rotor surface 248 which more particularly bounds the first, second, and third stator channels 240, 242, 244.

Figure 5:
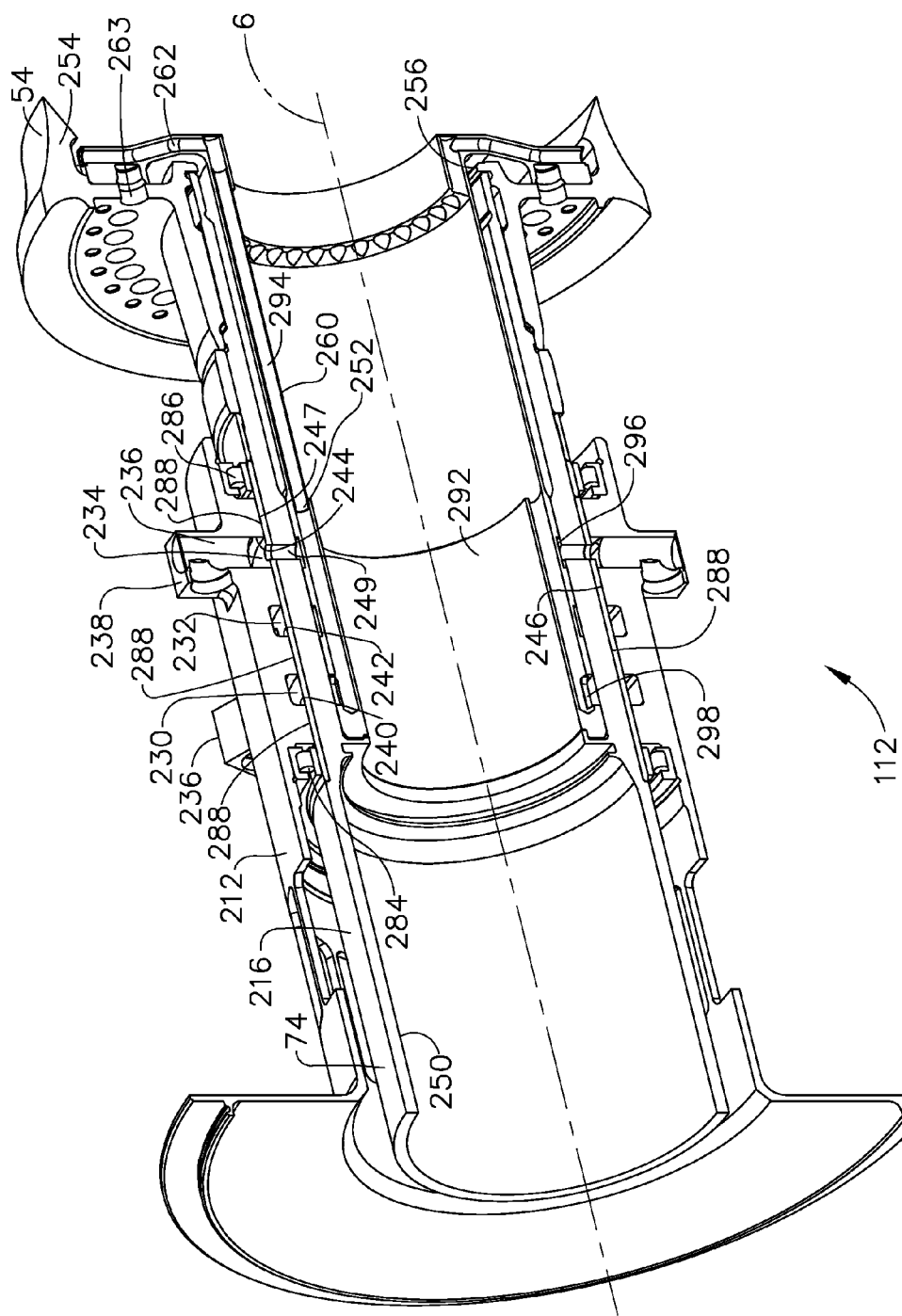
FIG. 5 is a cut-away perspective view illustration of the rotary union illustrated in FIG. 4.
Figure 6:
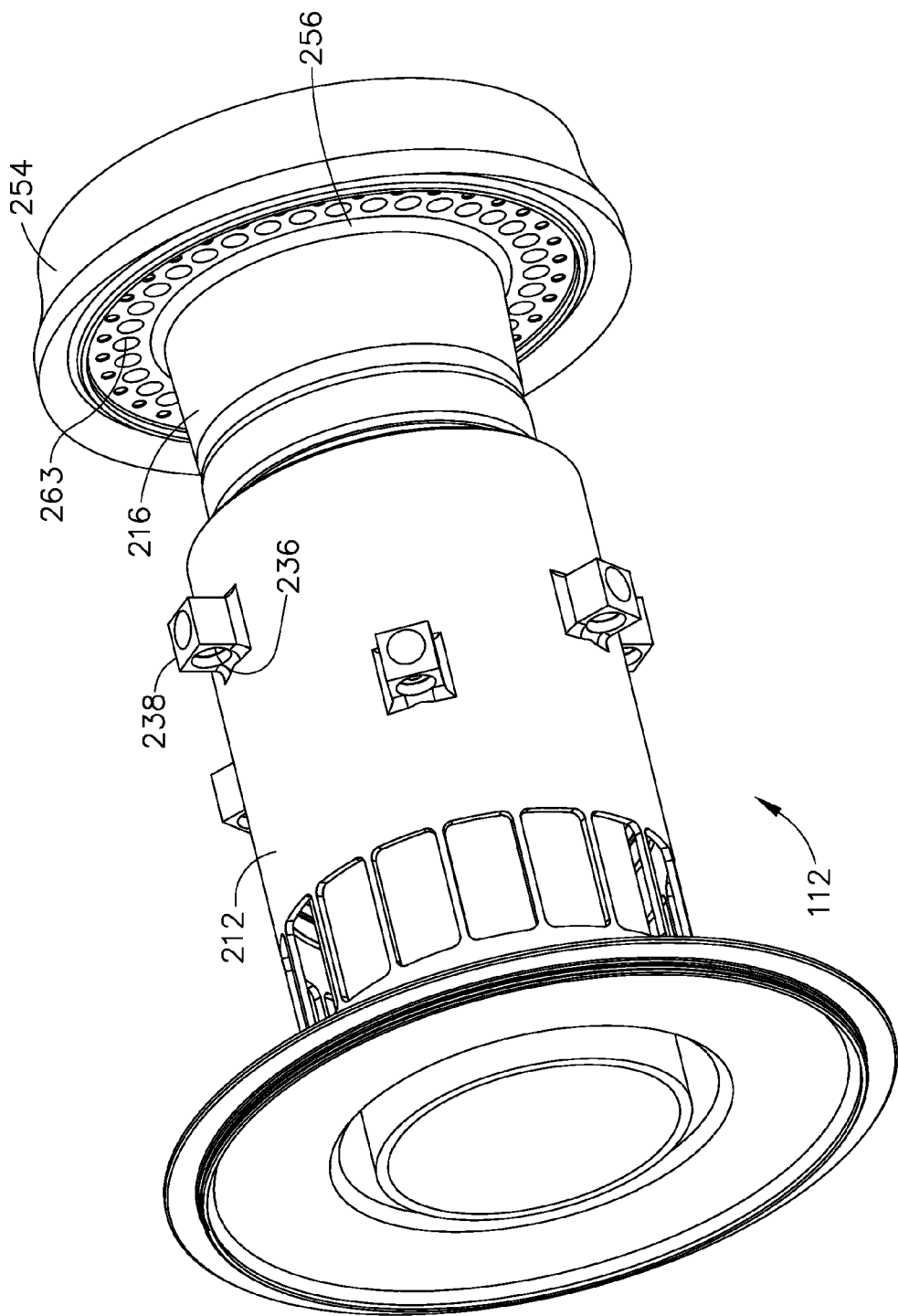
FIG. 6 is an outside perspective view illustration of the rotary union illustrated in FIG. 4.

Each of the fluid chambers has at least one inlet port 236. Two ports for each stator chamber is illustrated in FIGS. 5 and 6. The is one boss 238 per port 236 which fluidly connect the fluid chambers to the controlled pressurized hydraulic fluid supply 98. Two of the fluid chambers are for supply and used for course and fine adjustment of each of the forward and aft pitch change actuators 86, 88 and one of the chambers is used for return from each of the pitch change actuators.

Figure 4:
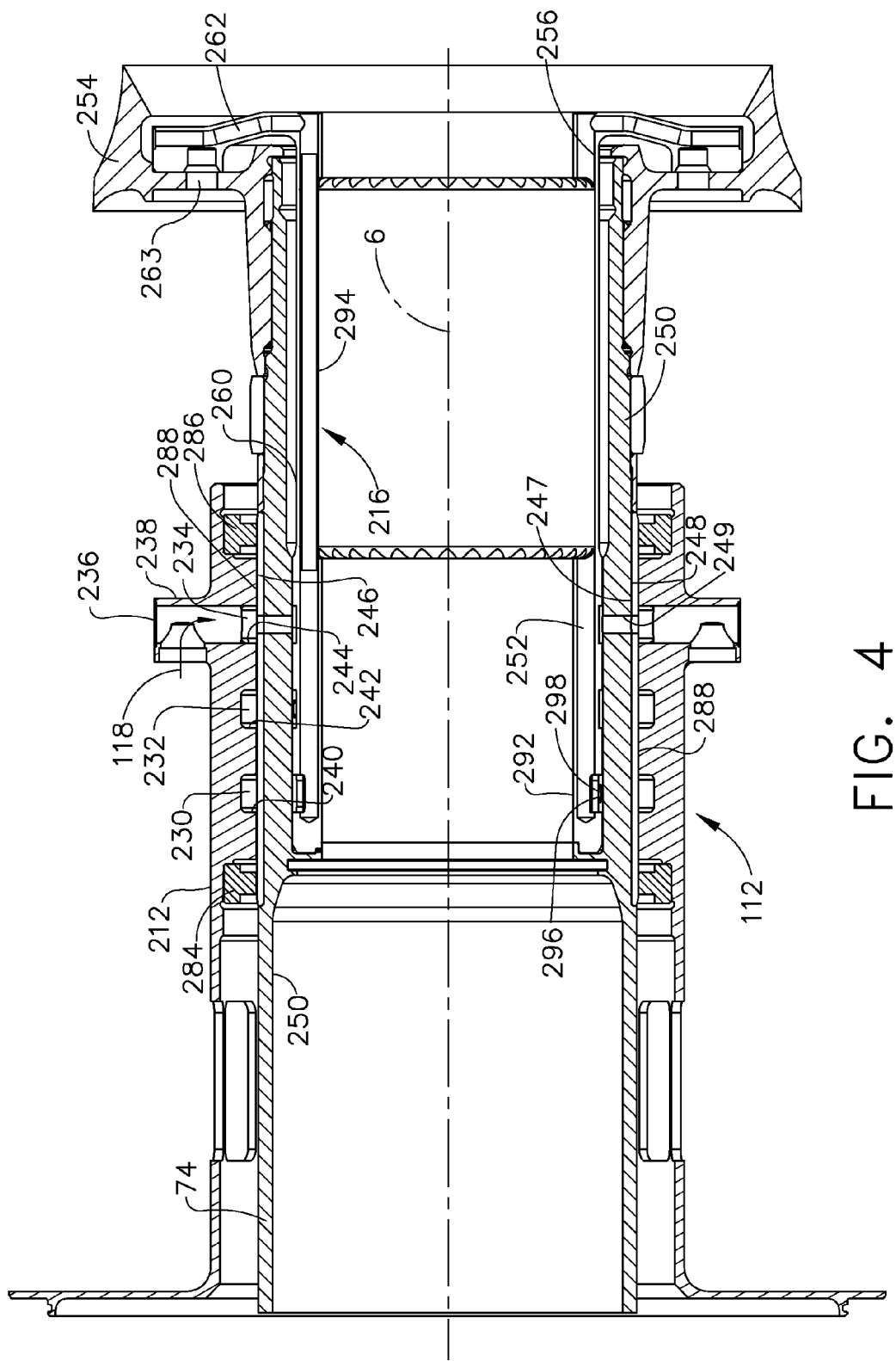
FIG. 4 is a longitudinal sectional view illustration of an aft hydraulic rotary union for a fluid circuit feeding the pitch change actuators illustrated in FIG. 3.

Referring to FIGS. 3 and 4, transfer holes 249, which are in fluid communication with the fluid chambers, radially extend entirely through the annular rotor stator race 247 and entirely through the annular rotor body 250 of the aft union rotor 216 to an annular rotary manifold 292 mounted to the annular rotor body 250. The transfer holes 249 are in fluid communication with fluid passageways 252 which extend axially aftwardly through the rotary manifold 292 and include intermediate tubes 294 mounted between the rotary manifold 292 and an annular flange 254 at an aft end 256 of the aft union rotor 216.

The fluid passageways 252 extend axially from the intermediate tubes 294 and then radially outwardly through the annular flange 254. Each of the fluid passageways 252 is carried at least in part by the annular rotor body 250 and includes an axial section 260 extending axially aftwardly through the rotary manifold 292, through one of the intermediate tubes 294, and into the annular flange 254.

Each of the axial sections 260 fluidly connects to a radial section 262 of the fluid passageway 252. The radial section 262 extends radially outwardly through the annular flange 254. The embodiments of the forward and aft hydraulic rotary unions 110, 112 illustrated herein include the annular rotor body 250 of the aft union rotor 216 being integral with the forward drive shaft 72 and the forward union rotor 214 being connected to and rotated by the aft drive shaft 74.

The fluid passageways 252 include passageway inlets 296 in the rotary manifold 292 that are in fluid communication with the transfer holes 249. The passageway inlets 296 are in direct fluid communication with the transfer holes 249 or in direct fluid communication with an annular rotary plenum 298 which is in direct fluid communication with the transfer holes 249 as illustrated in FIGS. 4 and 5. The annular rotary plenum 298 extends radially inwardly into the rotary manifold 292 and is in fluid communication with the axial sections 260 of the fluid passageways 252.

Referring to FIGS. 3, 4 and 5, each radial section 262 connects to a passageway exit 263 of the union rotor 214 which in turn is connected to a rotatable hydraulic line 270 leading to one of the forward and aft pitch change actuators 86, 88 mounted on one of the forward and aft rotatable frames 52, 54 respectively. The hydraulic lines 270 are mounted on the forward and aft rotatable frames 52, 54 respectively and include the forward supply and return rotatable lines 124, 126 and the aft supply and return rotatable lines 120, 122 respectively which are illustrated in FIG. 3. Note that the annular rotor body 250 and the axial section 260 of the fluid passageways 252 through the annular rotor body 250 of the union rotor 214 of the forward hydraulic rotary union 110 is longer than and passes through the aft hydraulic rotary union 112 to reach the annular flange 254.

Referring to FIGS. 4 and 5, forward and aft roller bearings 284, 286 located axially forwardly and aftwardly outboard of the stator channels in the aft union stator 212 assists smooth rotation radially between the aft union rotor 216 and the aft union stator 212. Annular seal lands 288 axially located between the stator channels in the aft union stator 212 and along the radially inner stator surface 246 of the aft union stator 212 and between the stator channels and the forward and aft roller bearings 284, 286 sealingly engage the annular rotor stator race 247 mounted on an annular rotor body 250 of the aft union rotor 216. This provides sliding rotational sealing between the aft union rotor 216 and the aft union stator 212 and sealing integrity between the stator channels and the chambers within.

Figure 7:
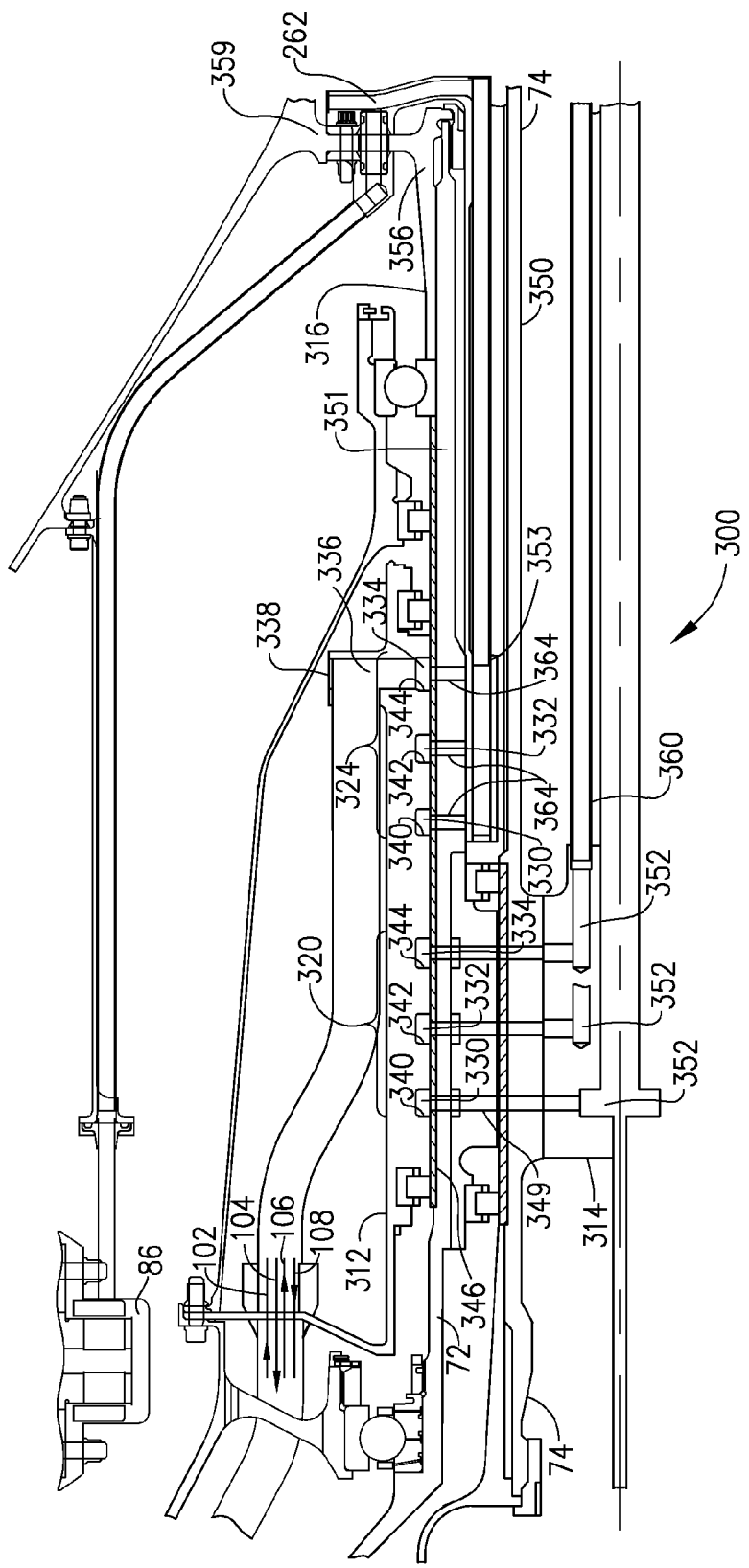
FIG. 7 is a longitudinal sectional view illustration of an alternative nested rotary union for the engine illustrated in FIG. 3.

An alternative embodiment of the forward and aft hydraulic rotary unions 110, 112 is a nested rotary union 300 illustrated in FIG. 7 in which the forward and aft union stators are combined or integral. The nested rotary union 300 integrates the forward and aft union stators into a common single stator 312 and forward and aft union rotors 314, 316 are concentrically disposed within the single stator 312.

The forward and aft union rotors 314, 316 include forward and aft annular rotor bodies 350, 351 respectively.

The forward annular rotor body 350 is illustrated herein as being integral with the aft drive shaft 74 and the aft annular rotor body 351 is illustrated herein as being integral with the forward drive shaft 72.

The forward union rotor 314 is rotatably mounted within the single stator 312 about an axis 6 which is an axis of rotation for the rotors. The aft union rotor 316 is rotatably mounted within the single stator 312. The forward union rotor 314 passes through and is rotatably mounted within the aft union rotor 316. The aft union rotor 316 is used to transfer pressurized hydraulic fluid 118 between the hydraulic fluid supply 98 and the forward pitch change actuator 86. The forward union rotor 314 is used to transfer the pressurized hydraulic fluid 118 between the hydraulic fluid supply 98 and the aft pitch change actuator 88.

The forward union rotor 314 is used to transfer the pressurized hydraulic fluid 118 between the non-rotating or static hydraulic fluid forward supply and return lines 102, 104 to aft supply and return rotatable lines 120, 122 (illustrated in FIG. 3) respectively. The aft union rotor 316 transfers the pressurized hydraulic fluid 118 between the hydraulic fluid aft supply and return lines 106, 108 and forward supply and return rotatable lines 124, 126 (illustrated in FIG. 3) respectively.

The hydraulic and fluid forward supply and return lines 102, 104 and hydraulic fluid aft supply and return lines 106, 108 are both mounted in the same aft structural turbine frame 64. The aft supply and return rotatable lines 120, 122 mounted in the aft rotatable frame 54 are connected to the aft pitch change actuators 88. The forward supply and return rotatable lines 124, 126 mounted in the forward rotatable frame 52 are connected to the forward pitch change actuators 86.

The nested rotary union 300 has forward and aft sets 320, 324 of first, second, and third fluid chambers 330, 332, 334 formed by first, second, and third stator channels 340, 342, 344 extending radially outwardly from and open through an annular radially inner stator surface 346 of the stator 312. The forward set 320 is located forward of the aft set 324 along the stator 312. Each of the stator channels has at least one port 336 and two ports for each stator channel is illustrated herein. One boss 338 per port 336 fluidly connects the stator channels and chambers to the controlled pressurized hydraulic fluid supply.

Two of the stator channels and chambers are for supply and used for course and fine adjustment of each of the forward and aft pitch change actuators 86, 88 and one of the chambers and stator channels is connected for return from each of the pitch change actuators.

Forward transfer holes 349 from the forward set 320 of the first, second, and third fluid chambers 330, 332, 334 and the first, second, and third stator channels 340, 342, 344 extend through the aft annular rotor body 351 to forward fluid passageways 352 carried by the forward annular rotor body 350 to an annular flange at an aft end of the forward union rotor 314 such as the annular flange 254 at an aft end 256 of the forward union rotor 214 illustrated in FIG. 4.

Aft transfer holes 364 from the aft set 324 of the first, second, and third fluid chambers 330, 332, 334 and the first, second, and third stator channels 340, 342, 344 radially extend all the way through the aft annular rotor body 351 of the aft union rotor 316 to aft fluid passageways 353 carried by an aft annular rotor body 351 of the aft union rotor 316 to an aft annular flange 359 at an aft end 356 of the aft union rotor 316 similar to the annular flange 254 at the aft end 256 of the aft union rotor 216 illustrated in FIG. 4. Each of the forward and aft fluid passageways 352, 353 includes an axial section 360 extending axially aftwardly through the forward and aft annular rotor bodies 350, 351 to a radial section 262 extending radially outwardly through the forward and aft annular flanges as illustrated in FIGS. 7 and 3. The embodiment of the nested rotary union 300 illustrated herein include the forward and aft annular rotor bodies 350, 351 of the forward and aft union rotors 314, 316 being integral with the forward and aft drive shafts 72, 74 respectively.

Figure 9:
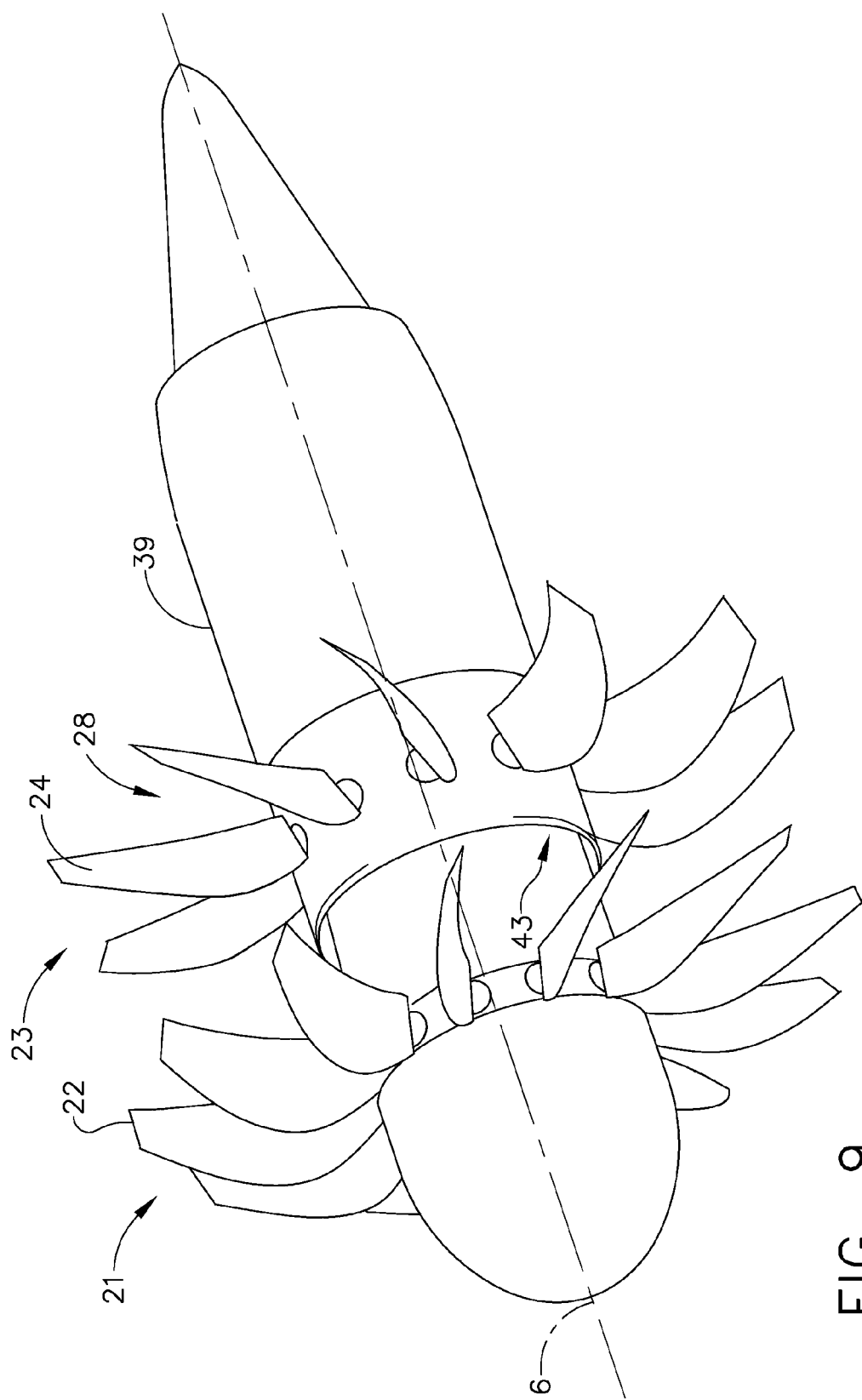
FIG. 9 is a prospective illustration of a second exemplary embodiment of an aircraft gas turbine engine with puller counter-rotatable propellers.
Figure 10:
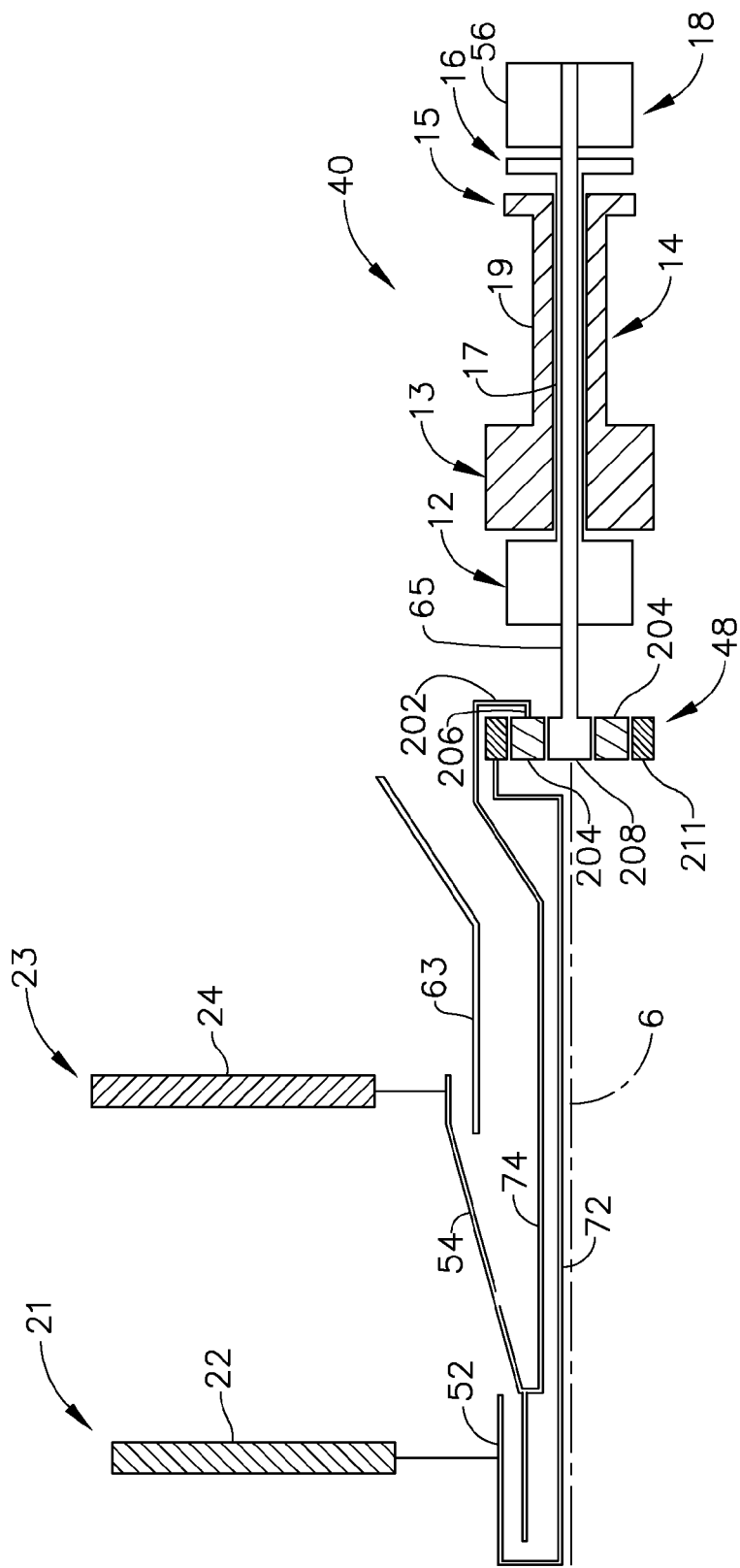
FIG. 10 is a diagrammatical illustration of an exemplary embodiment of an aircraft gas turbine engine with the puller counter-rotatable propellers illustrated in FIG. 9.
Figure 11:
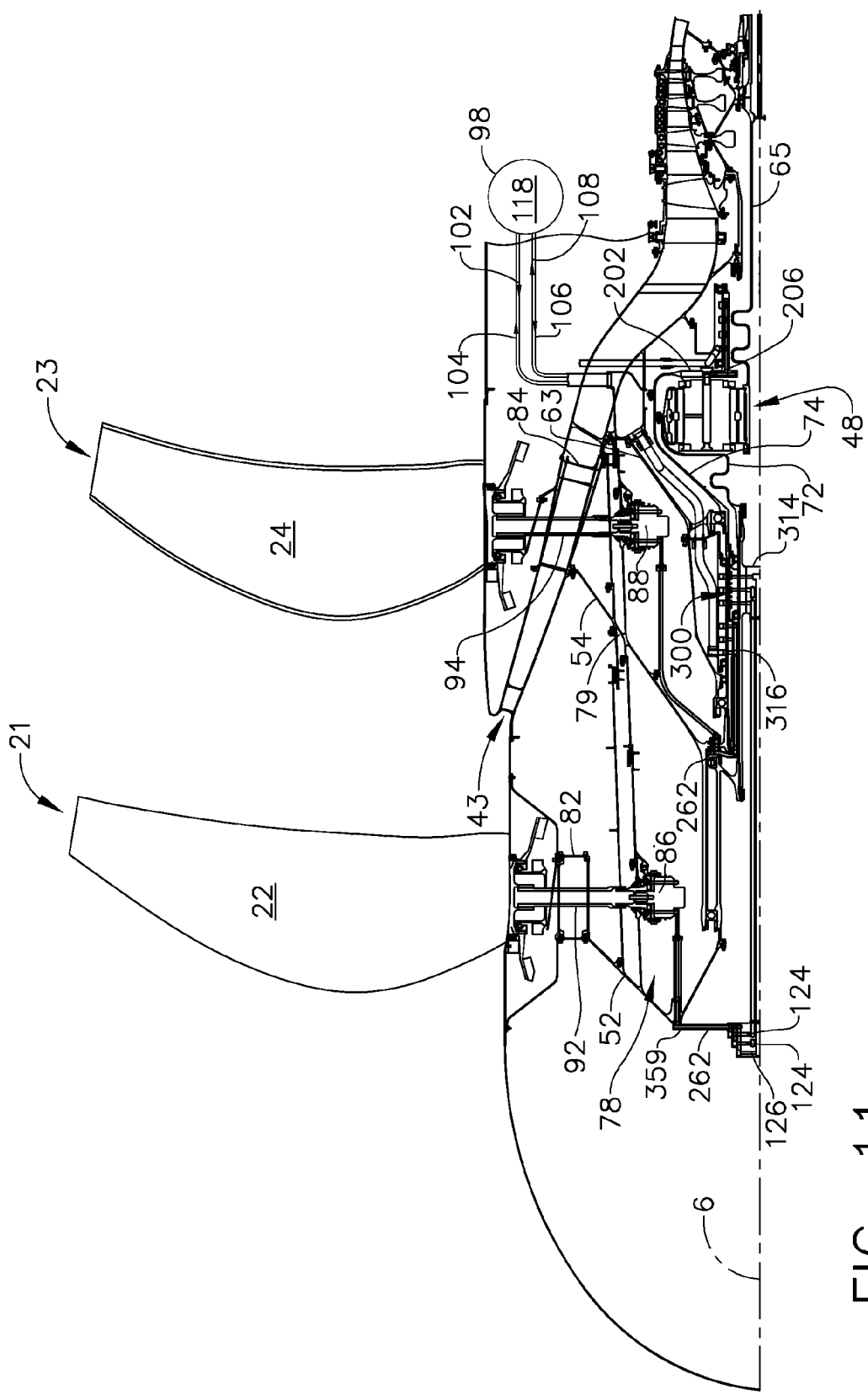
FIG. 11 is a longitudinal sectional view illustration of a portion of the engine illustrated in FIG. 9 including an exemplary embodiment of dual hydraulic fluid circuits for pitch change actuators for the counter-rotatable propellers illustrated in FIG. 9.

Illustrated in FIGS. 9-11 is a puller type open rotor aircraft gas turbine engine 20 having the spaced apart counter-rotatable forward and aft annular rows 21, 23 of forward and aft propellers 22, 24 located generally at a forward end 28 of the engine and forward of a gas generator 40 and an aft nacelle 39 surrounding the gas generator 40.

Referring to FIG. 11, the engine 20 includes an annular inlet 43 to the gas generator 40. The annular inlet 43 is located between the forward and aft annular rows 21, 23 of the forward and aft propellers 22, 24. The gas generator 40 is a gas turbine engine including low and high pressure compressor sections 12, 13, a combustor section 14, and high and low pressure turbine sections 15, 16 in a downstream axial flow relationship. The low and high pressure turbine section 16, 15 drives the low and high pressure compressor sections 12, 13 through low and high pressure shafts 17, 19 respectively. Located aft and downstream of the low pressure turbine section 16 is a power turbine 18 which drives the forward and aft annular rows 21, 23 of the forward and aft propellers 22, 24 through an epicyclic gearbox 48. Air passing through the gas generator 40 is compressed and heated to form a high energy (high pressure/high temperature) gas stream which then flows through the power turbine 18.

In the particular engine configuration illustrated in FIGS. 9-11, the power turbine 18 drives the forward and aft annular rows 21, 23 of the forward and aft propellers 22, 24 through the epicyclic gearbox 48 which counter-rotates the forward and aft propellers 22, 24. The forward and aft propellers 22, 24 are mounted on forward and aft rotatable frames 52, 54 respectively. The forward and aft rotatable frames 52, 54 are counter-rotatably mounted on a forward structural frame 63. The forward structural frame 63 is used to transfer thrust forces produced by the forward and aft propellers 22, 24 to an aircraft (not shown). The forward and aft annular rows 21, 23 of the forward and aft propellers 22, 24 of the puller type open rotor aircraft gas turbine engine 20 are forward of the forward structural frame 63 and hence the designation puller.

The power turbine 18 includes a power turbine rotor 56 rotatably mounted axially aft of the forward and aft annular rows 21, 23 of the forward and aft propellers 22, 24. The power turbine rotor 56 is drivingly connected to the gearbox 48 by a gearbox input shaft assembly 65. Forward and aft drive shafts 72, 74 are counter-rotatably connected to the gearbox 48 for driving the forward and aft rotatable frames 52, 54 respectively.

The gearbox 48 includes a rotatable annular carrier 202 having planetary gears 204 rotatably mounted on pins 206 cantilevered off the annular carrier 202. A sun gear 208 is meshed with and rotatably mounted radially inwardly of the planetary gears 204 and a ring gear 211 is meshed with and rotatably mounted radially outwardly of the planetary gears 204. The sun gear 208 is drivenly connected to the power turbine 18 by the gearbox input shaft assembly 65. The sun gear 208 is operable to drive the planetary gears 204 which, in turn, are operable to drive the ring gear 211 counter-rotatably with respect to carrier 202. The ring gear 211 is connected to the forward drive shaft 72 which in turn is connected to the forward rotatable frame 52 for driving the forward annular row 21 of the forward propellers 22 in a first circular direction (clockwise or counterclockwise). The carrier 202 is connected to the aft drive shaft 74, which in turn, is connected to the aft rotatable frame 54 for driving the aft annular row 23 of the aft propellers 24 in a second circular direction opposite that of or counter to the first circular direction.

Referring to FIG. 11, forward and aft pitch change systems 78, 79 control and set the pitch of the forward and aft propellers 22, 24. The forward and aft pitch change systems 78, 79 include hydraulic forward and aft pitch change actuators 86, 88 mounted on the forward and aft rotatable frames 52, 54 in a one to one ratio with the forward and aft rotatable struts 82, 84 respectively. Forward and aft rotatable shafts 92, 94 extend radially between and connect the forward and aft pitch change actuators 86, 88 to the forward and aft propellers 22, 24 respectively in a one to one ratio.

Figure 12:
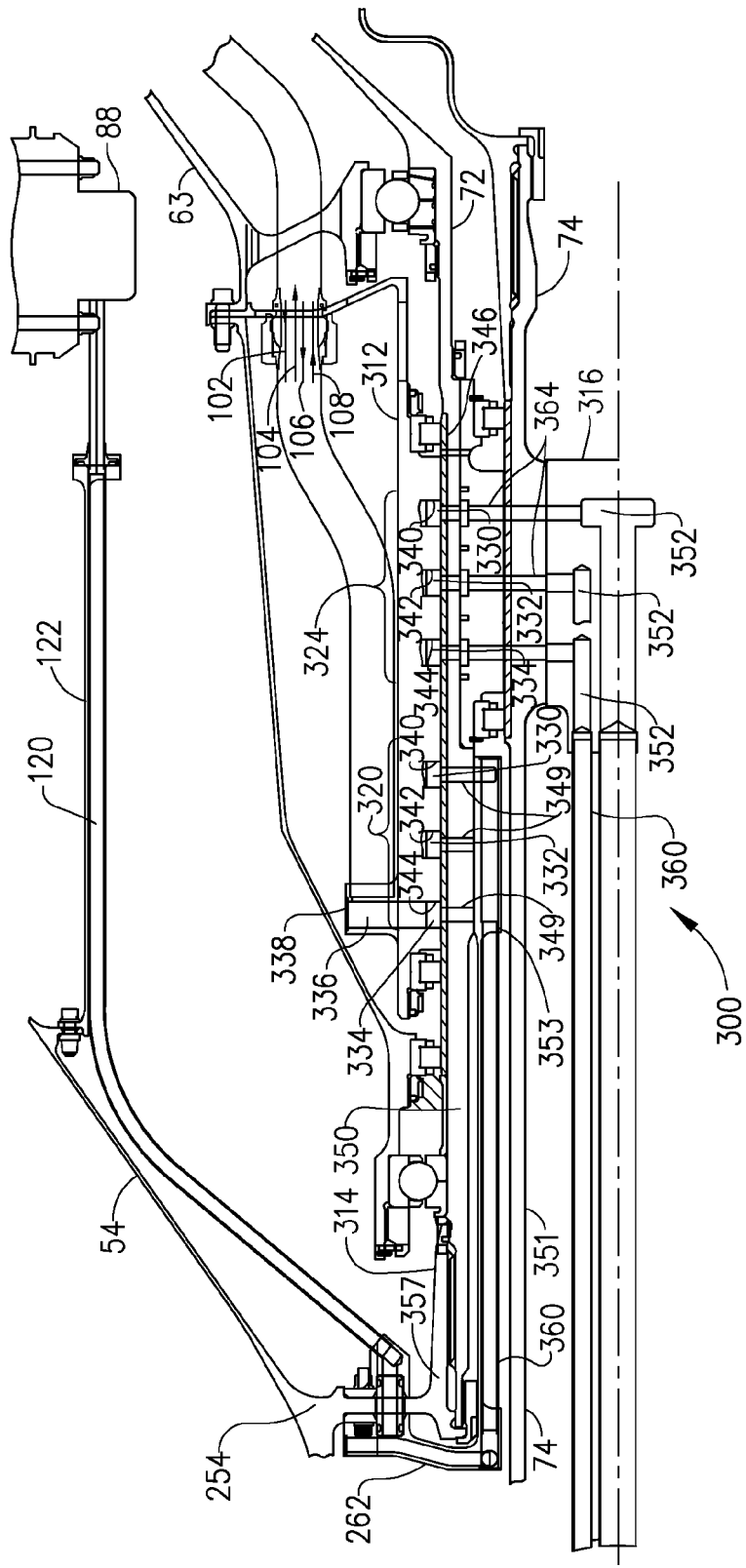
FIG. 12 is a longitudinal sectional view illustration a nested rotary union for the engine illustrated in FIG. 11.

Illustrated in FIGS. 11 and 12 is a nested rotary union 300 (similar to the one illustrated in FIG. 7 and disclosed above) in which the forward and aft union stators are combined or integral. The nested rotary union 300 transfers hydraulic fluid between the controlled pressurized hydraulic fluid supply 98 and the forward and aft pitch change actuators 86, 88. The nested rotary union 300 integrates the forward and aft union stators disclosed above into a common single stator 312. Forward and aft union rotors 314, 316 are concentrically disposed within the single stator 312.

The forward and aft union rotors 314, 316 include forward and aft annular rotor bodies 350, 351 respectively.

The forward annular rotor body 350 is illustrated herein as being integral with the forward drive shaft 72 and the aft annular rotor body 351 is illustrated herein as being integral with the aft drive shaft 74.

The hydraulic and fluid forward supply and return lines 102, 104 and hydraulic fluid aft supply and return lines 106, 108 are both mounted in the same forward structural frame 63. The forward supply and return rotatable lines 124, 126 are mounted in the forward rotatable frame 52 and are connected to the forward pitch change actuators 86. The aft supply and return rotatable lines 120, 122 are mounted in the aft rotatable frame 54 and are connected to the aft pitch change actuators 88.

The nested rotary union 300 has forward and aft sets 320, 324 of first, second, and third fluid chambers 330, 332, 334 formed by first, second, and third stator channels 340, 342, 344 extending radially outwardly from and open through an annular radially inner stator surface 346 of the stator 312. The forward set 320 is located forward of the aft set 324 along the stator 312. Each of the stator channels has at least one port 336 and two ports for each stator channel is illustrated herein. One boss 338 per port 336 fluidly connects the stator channels and chambers to the controlled pressurized hydraulic fluid supply.

Two of the stator channels and chambers are for supply and used for coarse and fine adjustment of each of the forward and aft pitch change actuators 86, 88 and one of the chambers and stator channels is connected for return from each of the pitch change actuators.

Forward transfer holes 349 from the forward set 320 of the first, second, and third fluid chambers 330, 332, 334 and the first, second, and third stator channels 340, 342, 344 extend through the forward annular rotor body 350 to aft fluid passageways 353 carried by the forward annular rotor body 350 to a forward annular flange 254 at a forward end 357 of the forward union rotor 314. The aft fluid passageways 353 include the aft supply and return rotatable lines 120, 122 mounted in the aft rotatable frame 54 which is operably connected to the aft pitch change actuators 88.

Aft transfer holes 364 from the aft set 324 of the first, second, and third fluid chambers 330, 332, 334 and the first, second, and third stator channels 340, 342, 344 extend through the forward annular rotor body 350 to forward fluid passageways 352 carried by the aft annular rotor body 351. The forward fluid passageways 352 include the forward supply and return rotatable lines 124, 126 mounted in the forward rotatable frame 52 operably connected to the forward pitch change actuators 86.

Each of the forward and aft fluid passageways 352, 353 includes an axial section 360 extending axially aftwardly through the forward and aft annular rotor bodies 350, 351 to a radial section 262 extending radially outwardly through forward and aft annular flanges 254, 359.

The forward and aft union rotors 314, 316 are rotatably mounted within the single stator 312 about an axis 6 which is an axis of rotation for the rotors. The aft union rotor 316 passes through and is rotatably mounted within the forward union rotor 314. The forward union rotor 314 is used to transfer pressurized hydraulic fluid 118 between the aft pitch change actuator 88 and the hydraulic fluid supply 98. The aft union rotor 316 is used to transfer pressurized hydraulic fluid 118 between the forward pitch change actuator 86 and the hydraulic fluid supply 98.

Figure 13:
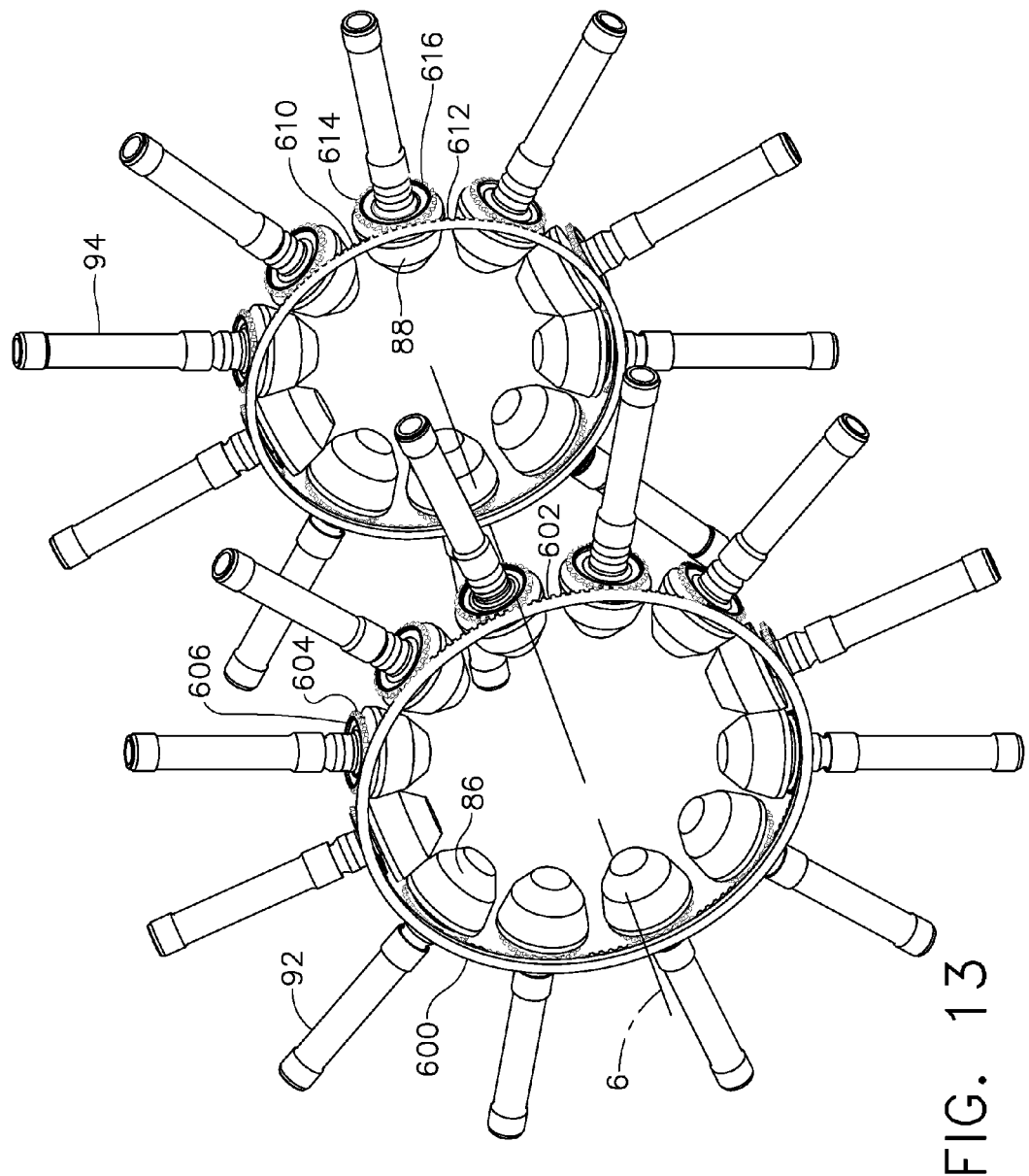
FIG. 13 is a prospective illustration of a first exemplary embodiment of the pitch change actuators ganged together with each propeller connected to a single pitch change actuator illustrated in FIG. 3.

FIG. 13 illustrates the forward pitch change actuators 86 ganged together by a forward unison ring 600 having ring teeth 602 engaging gear teeth 604 on forward gears 606 connected to the forward pitch change actuators 86 or the forward rotatable shafts 92 which are connected to the forward pitch change actuators 86. The aft pitch change actuators 88 are ganged together by an aft unison ring 610 having ring teeth 612 engaging gear teeth 614 on aft gears 616 connected to the aft pitch change actuators 88 or the aft rotatable shafts 94 which are connected to the aft pitch change actuators 88. Each propeller is connected to a single pitch change actuator. The ganging provides an even amount of pitch change to all the propellers having ganged together pitch change actuators. Ganging also provides a degree of redundancy to the entire pitch change system.

Figure 14:
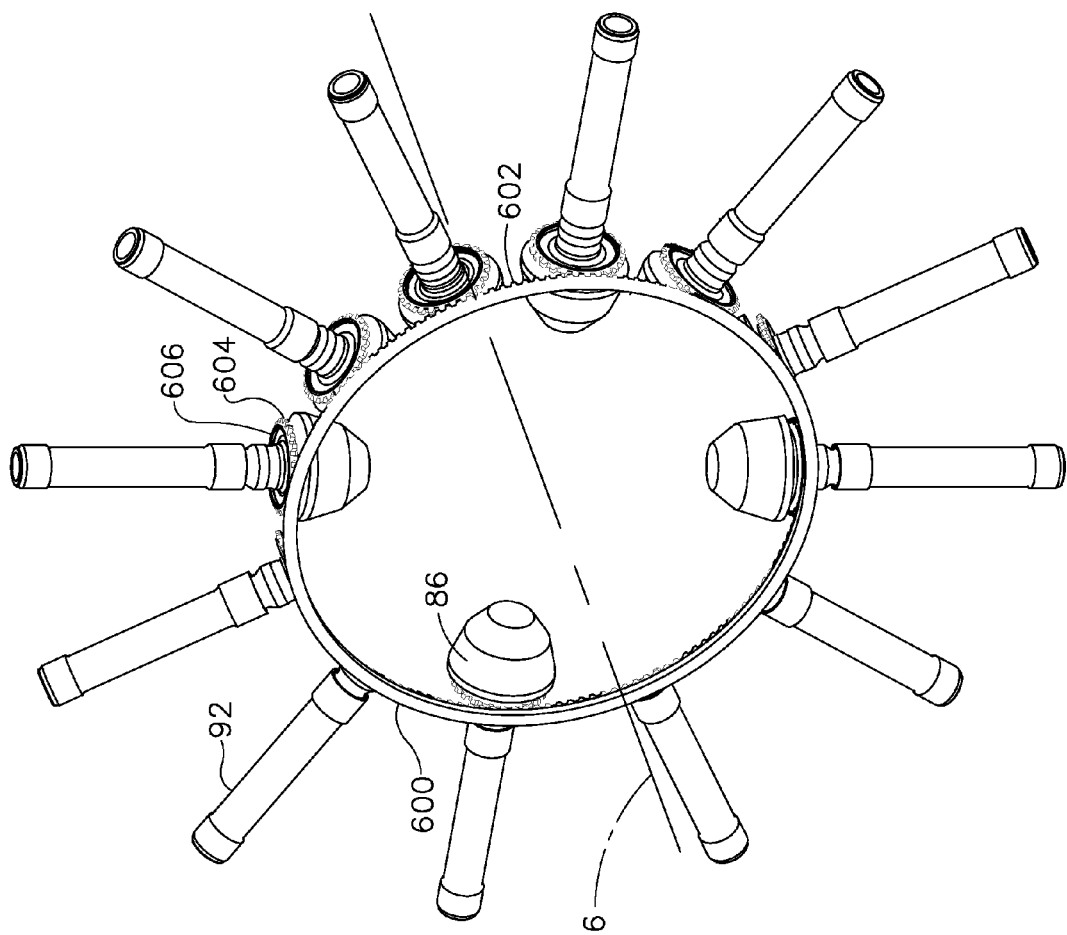
FIG. 14 is a prospective illustration of a second exemplary embodiment of the pitch change actuators ganged together with every third propeller connected to a single pitch change actuator illustrated in FIG. 3.

FIG. 14 illustrates pitch change actuators 86 ganged together by a unison ring 600 having ring teeth 602 engaging gear teeth 604 on gears 606 connected to the rotatable shafts 92 which are connected to the propellers 22 as illustrated in FIG. 3. However, not each of the propellers 22 is directly connected to a single pitch change actuator by a rotatable shaft 92. The embodiment of the ganged together actuators and rotatable shafts 92 illustrated in FIG. 14 has only a portion of the propellers 22 directly connected to a pitch change actuator 86 by a rotatable shaft 92. Every third rotatable shaft 92 in illustrated in FIG. 14 is directly driven by or is directly connected to a pitch change actuator 86. The number of rotatable shafts 92 directly driven by or directly connected to a pitch change actuator 86 may vary from application but the pitch change actuators 86 should be evenly distributed around the centerline axis 6.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

What is claimed is:

1. A propulsion apparatus comprising:
   axially spaced apart counter-rotatable forward and aft rows of forward and aft propellers mounted on forward and aft rotatable frames respectively and rotatable about a centerline axis,
   an exhaust flowpath which passes through the forward and aft rotatable frames, forward and aft pitch change systems including hydraulic forward and aft pitch change actuators mounted on the forward and aft rotatable frames and connected to and operable for controlling and setting pitch of the forward and aft propellers respectively, a hydraulic fluid supply mounted outboard of the forward and aft rotatable frames and hydraulically connected to forward and aft rotary unions including forward and aft union rotors mounted within forward and aft union stators respectively, the forward and aft rotary unions operable for transferring hydraulic fluid between the forward and aft union stators and the forward and aft union rotors respectively, the forward union rotor hydraulically connected to the aft pitch change actuators for transferring the hydraulic fluid from the forward rotary union to the aft pitch change actuators, and the aft union rotor hydraulically connected to the forward pitch change actuators for transferring the hydraulic fluid from the aft rotary union to the forward pitch change actuators.

2. A propulsion apparatus as claimed in claim 1, further comprising the forward and aft rotary unions axially spaced apart and operable for transferring the hydraulic fluid radially inwardly and outwardly between the forward and aft union stators and the forward and aft union rotors respectively.

3. A propulsion apparatus as claimed in claim 2, further comprising forward and aft drive shafts drivingly connected to the forward and aft rotatable frames respectively and the aft union rotor including an annular rotor body integral with the forward drive shaft.

4. A propulsion apparatus as claimed in claim 1, further comprising:
    forward and aft rotatable struts of the forward and aft rotatable frames respectively extending radially across the exhaust flowpath,
    the forward and aft pitch change actuators being hydraulic rotary actuators and mounted radially inwardly of the exhaust flowpath in a one to one ratio with the forward and aft rotatable struts of the forward and aft rotatable frames respectively, and
    forward and aft rotatable shafts extending through the forward and aft rotatable struts and connecting the forward and aft pitch change actuators to the forward and aft propellers respectively in a one to one ratio.

5. A propulsion apparatus as claimed in claim 4, further comprising the forward and aft rotary unions operable for transferring hydraulic fluid radially inwardly and outwardly between the forward and aft union stators and the forward and aft union rotors respectively.

6. A propulsion apparatus as claimed in claim 5, further comprising forward and aft drive shafts drivingly connected to the forward and aft rotatable frames respectively and the aft union rotor including an annular rotor body integral with the forward drive shaft.

7. A propulsion apparatus as claimed in claim 6, further comprising:
    the forward union rotor extending aftwardly through the aft union rotor,
    the aft union rotor including an annular rotor body integral with the forward drive shaft,
    the forward and aft union rotors respectively carrying at least in part fluid passageways,
    the fluid passageways carried by the forward union rotor in fluid communication with the hydraulic fluid forward supply and return lines and the aft supply and return rotatable lines respectively, and
    the fluid passageways carried by the annular rotor body within the aft union rotor in fluid communication with the hydraulic fluid aft supply and return lines and the forward supply and return rotatable lines respectively.

8. A propulsion apparatus as claimed in claim 7, further comprising:
    each of the forward and aft union stators including at least first and second fluid chambers having at least first and second stator channels respectively extending radially outwardly from and open through an annular radially inner stator surface of the forward and aft union stators,
    each of the fluid chambers having at least one inlet port connected to the hydraulic fluid supply, and
    the fluid passageways in fluid communication with the fluid chambers.

9. A propulsion apparatus as claimed in claim 8, further comprising:
    the aft union rotor including an annular rotor stator race mounted on the annular rotor body,
    a radially outer rotor surface of the annular rotor stator race in slidably sealing engagement with the inner stator surface,
    transfer holes in fluid communication with the fluid chambers and radially extending entirely through the annular rotor stator race and the annular rotor body to an annular rotary manifold mounted to the annular rotor body,
    the transfer holes in fluid communication with the fluid passageways extending axially aftwardly through the rotary manifold, and
    the fluid passageways including intermediate tubes in part connecting portions of the fluid passageways in the rotary manifold to radial sections of the fluid passageways.

10. A propulsion apparatus as claimed in claim 1, further comprising:
    the forward and aft rotary unions integrated in a single nested rotary union,
    the forward and aft union stators integrated in a common single stator, and
    the nested rotary union operable for transferring hydraulic fluid radially inwardly and outwardly between the common single stator and the forward and aft union rotors.

11. A propulsion apparatus as claimed in claim 10, further comprising:
    a flowpath which passes through the forward and aft rotatable frames,
    forward and aft rotatable struts of the forward and aft rotatable frames respectively extending radially across the exhaust flowpath,
    the forward and aft pitch change actuators being hydraulic rotary actuators and mounted radially inwardly of the flowpath in a one to one ratio with the forward and aft rotatable struts of the forward and aft rotatable frames respectively, and
    forward and aft rotatable shafts extending through the forward and aft rotatable struts and connecting the forward and aft pitch change actuators to the forward and aft propellers respectively in a one to one ratio.

12. An aircraft gas turbine engine comprising:
    a gas generator upstream and operable to power a power turbine,
    a nacelle surrounding at least the gas generator,
    axially spaced apart counter-rotatable forward and aft rows of forward and aft propellers mounted on forward and aft rotatable frames respectively and rotatable about a centerline axis, the power turbine drivingly connected to the forward and aft rotatable frames, forward and aft pitch change systems including hydraulic forward and aft pitch change actuators mounted on the forward and aft rotatable frames and connected to the forward and aft propellers and operable for controlling and setting pitch of the forward and aft propellers respectively, a hydraulic fluid supply mounted outboard of the forward and aft rotatable frames and connected to forward and aft rotary unions, the forward and aft rotary unions including forward and aft union rotors mounted within forward and aft union stators and operable for transferring hydraulic fluid between the forward and aft union stators and the forward and aft rotary union rotors respectively, the forward union rotor hydraulically connected and operable to transfer the hydraulic fluid to the aft pitch change actuator, and the aft union rotor hydraulically connected and operable to transfer the hydraulic fluid to the forward pitch change actuator.

13. An engine as claimed in claim 12, further comprising:
a flowpath which passes through the forward and aft rotatable frames, forward and aft rotatable struts of the forward and aft rotatable frames respectively extending radially across the exhaust flowpath, the forward and aft pitch change actuators being hydraulic rotary actuators and mounted radially inwardly of the flowpath in a one to one ratio with the forward and aft rotatable struts of the forward and aft rotatable frames respectively, and forward and aft rotatable shafts extending through the forward and aft rotatable struts and connecting the forward and aft pitch change actuators to the forward and aft propellers respectively in a one to one ratio.

14. An engine as claimed in claim 13, further comprising the forward and aft rotary unions operable for transferring hydraulic fluid radially inwardly and outwardly with respect to the centerline axis between the forward and aft union stators and the forward and aft union rotors respectively.

15. An engine as claimed in claim 14, further comprising forward and aft drive shafts counter-rotatably connected to the power turbine and drivingly connected to the forward and aft rotatable frames respectively and the aft union rotor including an annular rotor body integral with integral with the forward drive shaft.

16. An engine as claimed in claim 13, further comprising:
a power turbine rotor of the power turbine rotatably mounted on and between axially spaced apart forward and aft structural turbine frames of the engine, the power turbine rotor drivingly connected to an epicyclic gearbox, and the epicyclic gearbox drivingly connected by forward and aft drive shafts to the forward and aft rotatable frames for counter-rotatably driving the forward and aft rotatable frames and the forward and aft propellers mounted thereon.

17. An engine as claimed in claim 16, further comprising:
the forward union stator mounted on the forward structural turbine frame and the forward union stator connected to the hydraulic fluid supply by hydraulic fluid forward supply and return lines, the aft union stator mounted on the aft structural turbine frame and the aft union stator connected to the hydraulic fluid supply by hydraulic fluid aft supply and return lines, the forward hydraulic rotary union operable for transferring pressurized hydraulic fluid between the hydraulic fluid forward supply and return lines and aft supply and return rotatable lines respectively, the aft hydraulic rotary union operable for transferring the pressurized hydraulic fluid between the hydraulic fluid aft supply and return lines and forward supply and return rotatable lines respectively, the forward union rotor connected to the aft supply and return rotatable lines mounted in the aft rotatable frame and connected to the aft pitch change actuators, and the aft union rotor connected to the forward supply and return rotatable lines mounted in the forward rotatable frame and connected to the forward pitch change actuators.

18. An engine as claimed in claim 17, further comprising:
the forward union rotor extending aftwardly through the aft union rotor, the aft union rotor including an annular rotor body integral with the forward drive shaft, the forward and aft union rotors respectively carrying at least in part fluid passageways, the fluid passageways carried by the forward union rotor in fluid communication with the hydraulic fluid forward supply and return lines and the aft supply and return rotatable lines respectively, and the fluid passageways carried by the annular rotor body within the aft union rotor in fluid communication with the hydraulic fluid aft supply and return lines and the forward supply and return rotatable lines respectively.

19. An engine as claimed in claim 18, further comprising:
each of the forward and aft union stators including at least first and second fluid chambers having at least first and second stator channels respectively extending radially outwardly from and open through an annular radially inner stator surface of the forward and aft union stators, each of the fluid chambers having at least one inlet port connected to the hydraulic fluid supply, and the fluid passageways in fluid communication with the fluid chambers.

20. An engine as claimed in claim 19, further comprising:
the aft union rotor including an annular rotor stator race mounted on the annular rotor body, a radially outer rotor surface of the annular rotor stator race in slidably sealing engagement with the inner stator surface, transfer holes in fluid communication with the fluid chambers and radially extending entirely through the annular rotor stator race and the annular rotor body to an annular rotary manifold mounted to the annular rotor body, and the transfer holes in fluid communication with the fluid passageways extending axially aftwardly through the rotary manifold.

21. An engine as claimed in claim 20, further comprising the fluid passageways including intermediate tubes in part connecting portions of the fluid passageways in the rotary manifold to radial sections of the fluid passageways.

22. An engine as claimed in claim 12, further comprising:
the forward and aft rotary unions integrated in a single nested rotary union, the forward and aft union stators integrated in a common single stator, and the nested rotary union operable for transferring hydraulic fluid radially inwardly and outwardly between the common single stator and the forward and aft union rotors.

23. An engine as claimed in claim 22, further comprising:

a flowpath which passes through the forward and aft rotatable frames, forward and aft rotatable struts of the forward and aft rotatable frames respectively extending radially across the exhaust flowpath, the forward and aft pitch change actuators being hydraulic rotary actuators and mounted radially inwardly of the flowpath in a one to one ratio with the forward and aft rotatable struts of the forward and aft rotatable frames respectively, and forward and aft rotatable shafts extending through the forward and aft rotatable struts and connecting the forward and aft pitch change actuators to the forward and aft propellers respectively in a one to one ratio.

24. A propulsion apparatus as claimed in claim 1, further comprising the forward and aft rotatable frames counter-rotatably mounted on a structural frame and the counter-rotatable forward and aft rows of forward and aft propellers located forward or aft of the structural frame.

* * * * *